BEST AVAILABLE COPY
Sheet 1 of 2 Sheets
G. W. Lee.
Seed-Planter.
No 2863 Reissued Feb. 11, 1868.
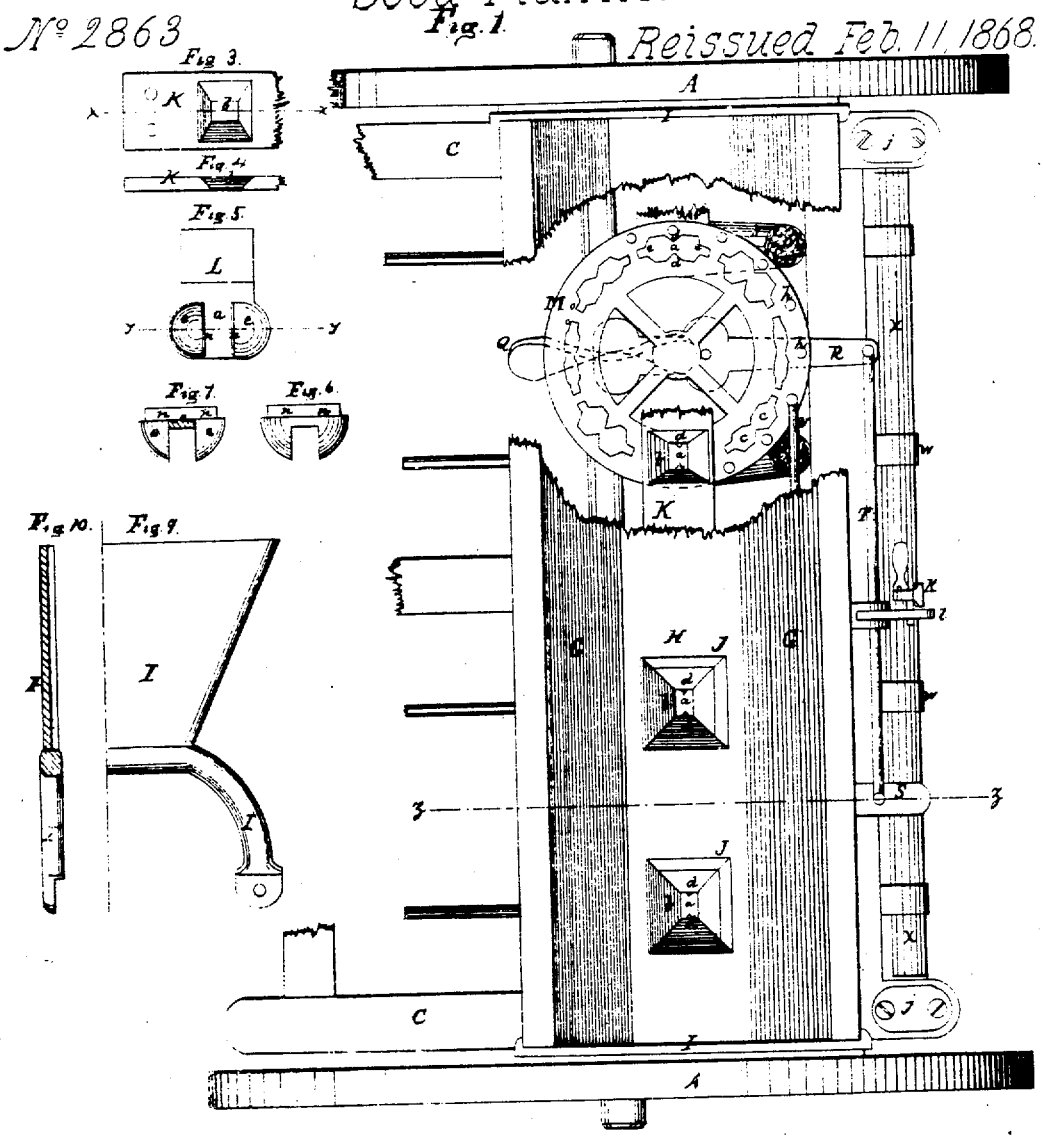
Witnesses.
Robert H. Smith
Alex Mahon
Inventor.
Adam R. Rees
by his atty
A M Smith BEST AVAILABLE COPY
G. W. Lee.
Seed-Planter.
No. 2863
Reissued Feb. 11, 1868.
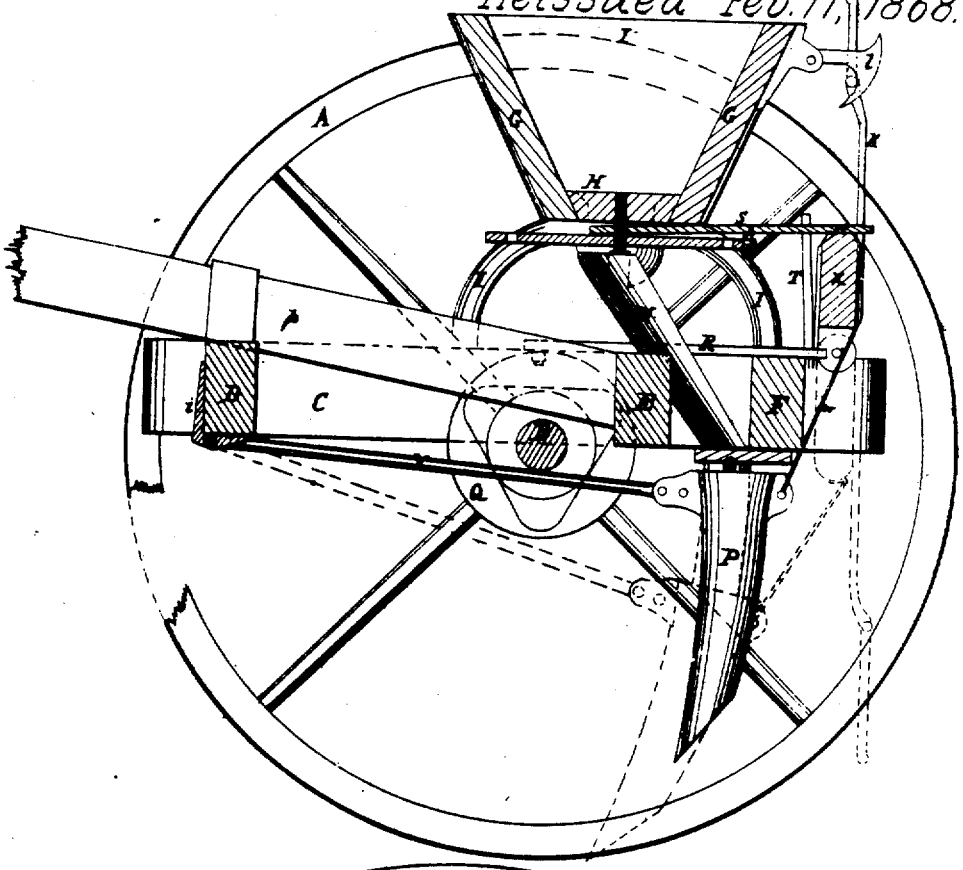
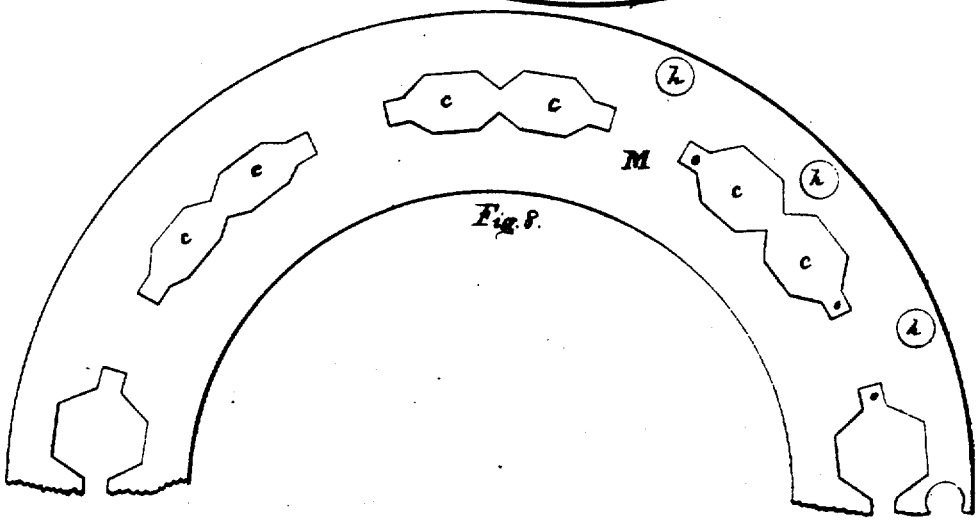
Fig. 8.
Witnesses.
Robert H. Smith
Alex Mahon
Inventor.
Adam R. Rice
by his Atty
A. M. Smith

BEST AVAILABLE COPY

UNITED STATES PATENT OFFICE.

ADAM R. REESE, OF PHILLIPSBURG, N. J., ASSIGNEE OF GEORGE W. LEE.

IMPROVEMENT IN SEED-PLANTERS.

Specification forming part of Letters Patent No. 11,967, dated November 21, 1854; Reissue No. 2,863, dated February 11, 1868.

*To all whom it may concern:*

Be it known that GEORGE W. LEE, formerly of Ercildoun, Pennsylvania, but now of Winchester, county of Columbiana, and State of Ohio, did invent certain new and useful improvements in machines for drilling grain and seeds of different kinds, of which the following is a full, clear, and exact description, reference being had to the accompanying drawings, making a part of this specification, in which—

Figure 1 is a plan or top view with the seed-box broken away to show one of the seeding-wheels. Fig. 2 is a sectional elevation through the line *z z* of Fig. 1. The other figures, from 3 to 10, inclusive, will be referred to in the description.

Similar letters of reference denote corresponding parts in all the figures.

To enable others skilled in the art to make and use the improvements, I will proceed to describe their construction and operation, referring to the drawings, in which—

A A are the wheels, fitted to the axle B, one of which may be fastened to the axle and the other allowed to turn loose upon it. The axle B is fitted to turn loose in boxes fastened to the under side of the rails C C, which rails C C are connected together by the bars D E F, so as to form the frame of the carriage. G G are the sides of the seed-box, and H the bottom, supported by the ends I I, which ends are fastened to the rails C C. These end pieces are made of iron cast in one piece with the feet, and provided with flanges projecting inward for the front and rear boards to rest against, said flanges being made flaring or receding from each other, so as to give the desired inclination to the front and rear boards, as shown in Figs. 1 and 2. The form of these cast-iron end pieces is shown in detached sectional views, Figs. 9 and 10. The bottom H of the seed-box is provided with a series of holes, J J, enlarged at the top. Immediately beneath each of these holes a plate, K, is fastened, (see Figs. 3 and 4,) the latter being a section of the former cut through the center lengthwise. The plate K is provided with a hopper-shaped hole, *b*, to facilitate the passage of the seed and permit it to pass down onto the plate L. (See Fig. 5, which is a plan; Fig. 6, an elevation; Fig. 7, a section of Fig. 5, cut through the line *y y*.) The plate L is fastened directly under the plate K, so that the bar *a* is directly below the hole *b*, and the plate L is bent down, so as to leave a space for the edge of the vibrating disk M, which is made in the form represented. (See a section of a full-sized disk, Fig. 8.) The holes *c c* in the disk M are made of different sizes, so as to drill different kinds or quantities of grain, and are provided with projections *d d*, which sweep the grain from the bar *a* into the openings *e e*, from which openings it falls into the spout N and passes down into the tube O, which conducts it into the drilling-tooth P, which deposits it in the ground. The disks M M vibrate upon pivots which turn in holes made in the bottom of the seed-box for that purpose, and are operated by the cam Q upon the axle B, which cam vibrates the lever R upon a screw in the bar E, which lever R is connected to the lever S (which vibrates upon the pivot of the disk M) by the rod T. The lever S is provided with a pin, *f*, fitted to the holes *h h* in the disks M, and the disks are connected together by the rod U, which is provided with a pivot at each end fitted to the holes *h h* in the disks. The drilling-teeth P may be made in the form represented, or otherwise, and fastened to the rod V, which rod is hinged to the bar D by stands *i*. The drilling-teeth are raised by the straps *w*, fastened to them and to the bar *x*, which bar vibrates upon the pivoted stands *j j*, fastened to the rail C, and is operated by the hand-lever *k*, and fastened up in the position represented, so as to hold up the teeth P by the hook *l*, fastened to the seed-box. When the bar *x* is turned up it raises the lever S and lifts the pin *f* out of the hole *h*, so that it ceases to vibrate the disks and deliver seed, as the scores *n n* in the bar *a* of the plate L prevent the seed from rolling off of the bar *a*, even if the bar is inclined to a limited extent, until the disks M are put in motion again. By this arrangement the teeth are raised and the seed stopped at once whenever the operator desires it. The holes *c c* are gradually narrowed toward their extremities and terminate in the scores *o o*, as represented, so as to save the grain from being cut between the ends of the holes *c c* and the edges of the hole *b* and wasted, as it might be if they were constructed otherwise. If there was a bar across the holes *c c*, instead of the points *d d*, the seed

BEST AVAILABLE COPY or grain would be cut to pieces between the edges of such bar and the edges of the hole *b;* but as the points *d d* in the disk form an angle of about forty-five degrees with the edges of hole *b*, these angles press or crowd the seed toward the space between the points, so that they escape being cut, either by passing under the plate K or passing through between the points *d d*. As the openings *c c* are gradually reduced toward each end by angles similar to those above mentioned and terminate in the scores *o o*, the seed passes into the scores, or escapes above the plate K as the machine is operated in drilling the seed.

It will be apparent that machines may be built with such a number of disks and with such a number of holes in each disk as may be desirable, and that the disks may be connected by a series of rods like the rod U, and in drilling angular pieces of land they may be removed in succession, so as to allow the disk to stop in succession, as required, and by using a cam more or less curved, or with a greater or less number of curves, more or less seed can be drilled to the acre; or, if one or both of the pins in the lever R, which are acted upon by the cam Q, are fitted to slats in the lever R and provided with screw-nuts, they may be set nearer together or farther apart, so as to vary the quantity of seed drilled to an acre. *p* is the section of a tongue to which the team may be harnessed to draw the machine.

What is claimed herein, and sought to be secured by Letters Patent as the invention of the said GEORGE W. LEE, is—

1. The cast-iron ends of the seed-box of a grain-drill, provided with flanges formed thereon fitting and supporting the ends of the front and rear boards, and with legs or feet for supporting the box on the main frame, as described.

2. The scores *o o*, or their equivalent, at the extremities of the holes *c* in the disks M, in combination with the gradual narrowing of the holes toward their extremities, so as to save the grain from being cut, substantially as described.

In testimony whereof witness my hand this 22d day of July, 1867.

ADAM R. REESE.

Witnesses:

IRVIN C. REESE,
W. R. REESE.